H. O. THOMAS.
TRUCK.
No. 11,530.
Reissued Apr. 7, 1896.
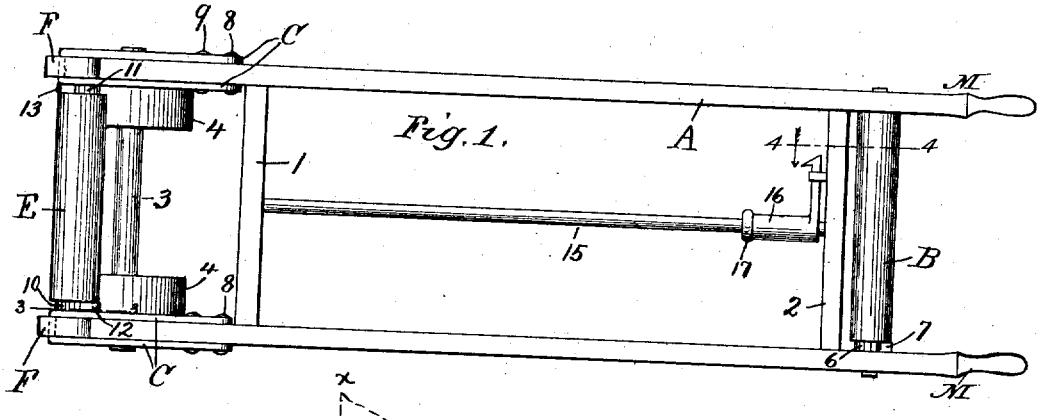
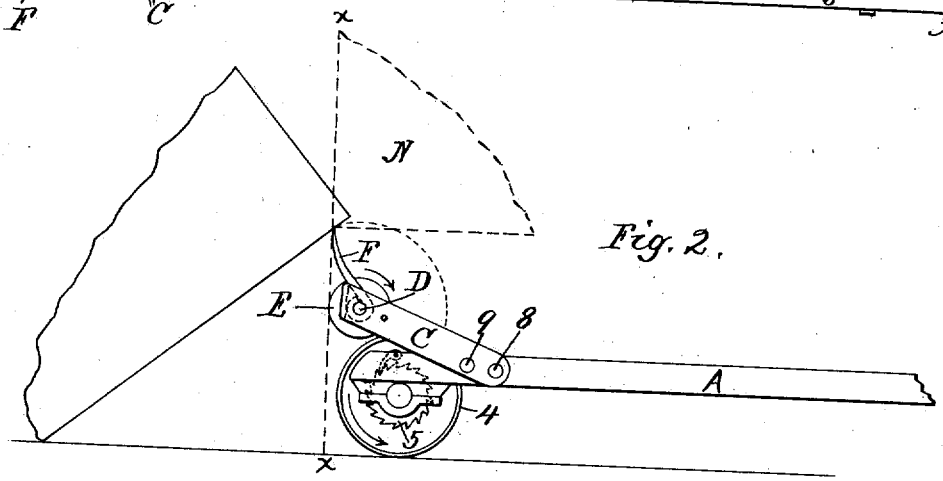
Fig. 3.
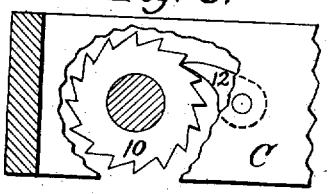
Fig. 4.
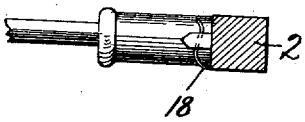
Witnesses.
E. T. Wray.
Jas. Elliott.
Inventor:
Henry O. Thomas
by Burton and Burton
his attys
ANDREW B. GRAHAM, PHOTO-LITHO. WASHINGTON, D.C.

UNITED STATES PATENT OFFICE.

HENRY O. THOMAS, OF KIMBALL, NEBRASKA, ASSIGNOR, BY DIRECT AND MESNE ASSIGNMENTS, TO THE THOMAS AUTOMATIC HAND TRUCK COMPANY, OF CHICAGO, ILLINOIS.

TRUCK.

SPECIFICATION forming part of Reissued Letters Patent No. 11,530, dated April 7, 1896.

Original No. 509,054, dated November 21, 1893. Application for reissue filed December 8, 1893. Serial No. 493,155.

*To all whom it may concern:*

Be it known that I, HENRY O. THOMAS, a citizen of the United States, residing at Kimball, county of Kimball, and State of Nebraska, have invented certain new and useful Improvements in Trucks, which are fully set forth in the following specification, reference being had to the accompanying drawings, forming a part thereof.

This invention relates to hand-trucks; and its object is to provide a truck by means of which heavy loads can be readily loaded onto the truck, as will be hereinafter more fully described.

In the drawings, Figure 1 is a top or plan view of the truck in horizontal position or down. Fig. 2 is a side elevation with the parts toward the handle end broken away, the truck being shown in the position of lifting the load. Fig. 3 is a detail section at the line 3 3 on Fig. 1, showing a pawl-and-ratchet device in side elevation. Fig. 4 is a detail section at the line 4 4, showing in side elevation a spring-catch used in holding the drop-spur out of use.

A A are the main side bars of my improved truck. They are connected by means of the transverse bars 1 and 2, making a rigid frame.

3 is the ordinary main supporting-shaft of the supporting-wheels 4 4, which are mounted on the shaft inside the side bars. Each of these wheels 4 4 is provided with a ratchet 5 5, secured to the outer face of the wheel and adapted to be engaged by a pawl mounted on the adjacent frame-bar A.

At the upper or handle end of the truck I provide a transverse roll B, of suitable material and size, which is also provided with a ratchet-wheel 6 at the upper end, adapted to be engaged by the pawl 7. This pawl and ratchet is arranged to permit the roll B to revolve in a direction in which it would be actuated by the engagement of the load resting upon it and sliding toward the handle M, and to prevent the roll from revolving in the opposite direction while the pawl is engaged with the ratchet.

Secured to each of the side bars A, near the lower end of the truck, is a bracket C, preferably of strap-iron folded to encompass the side bar and rigidly secured thereto by bolts 8 and 9. These brackets extend off at an oblique angle from the side bars to which they are secured, respectively, and near their extremities, remote from the points of fastening to the side bars, there is a shaft D, which passes transversely through both of the brackets parallel with the shaft 3 of the supporting-wheels 4, and on this shaft D, between the brackets, there is journaled a roll E. This roll E is provided at opposite ends, respectively, with ratchets 10 and 11, one being a right-handed and the other a left-handed ratchet, and the pawls 12 and 13, adapted to engage said ratchets, respectively, are mounted in suitable relation to them on the brackets C C, respectively. Upon the shaft D, between the side bars of each of the brackets C, are pivotally mounted two curved shoes F of suitable material, which rest normally against the forward portion of the bracket which connects the side arms thereof, so that the shoes are stopped against the bracket in the open position shown in Fig. 2. A rod 15 extends lengthwise of the truck-frame, between the cross-bars 1 and 2 thereof, and upon this rod a drop-spur 16, having a sleeve or collar 17, by which it may be operated, is adapted to slide from end to end of the rod and rotate. Secured to the brace 2 is a spring 18, adapted to engage the spur 16 to hold it in position substantially in the plane of the side bars A and cross-bars 2 out of the way of the load when not in use to engage the pawl.

This truck can be made in any suitable width, and the roller E, if necessary, can be divided into several sections, and the main shaft 3 can also be provided with any desired number of supporting-wheels, and any desired number of additional shoes may be provided.

The device is further susceptible of modification in that one of the frame-pieces A could be made sufficiently large and strong, and provided with a single supporting-wheel roller and shoe, so that the device could be used as a tool in lifting heavy loads. In this modification the wheel 4 will be given any necessary support, and, if necessary, could be mounted directly below the bar A.

When the device has been properly arranged and constructed, the operation will be as follows: In raising a heavy box, for instance, the truck-frame will be held with the bars A in substantially vertical position, with the supporting-wheels lifted off of the floor and the weight of the truck being carried on the roller E, as will be understood by referring to Fig. 2, wherein the dotted line *x x* would represent the floor-line in that position of the truck, the point of the shoes being on the floor and adapted by their free pivotal connection to the truck to follow any irregularities of the floor and remain in contact at the points therewith, so that the momentum which the truck might acquire in being advanced rapidly toward the box will serve to drive the points of the shoes under it. As soon as the shoes are thus forced under the load, the truck-handles being depressed, the load will be lifted on the points of the shoes, the truck sliding slightly toward or under the load, first taking the roller E off the floor and bringing the weight of the load onto the wheels 4 4, and then, as the movement of the truck-handles downward is continued, lifting the end of the load engaged on the points of the shoes to such position as that shown by the full lines representing the load in Fig. 2. The pawl and ratchets pertaining to the wheel 4 4 being engaged and permitting the wheels to revolve only in a direction corresponding to the advance movement of the truck, the depressing of the handles described will easily cause the wheels to advance toward and eventually under the load in the manner described. As soon as the load is raised to a sufficient height, as in Fig. 2, a sudden forward movement of the truck will carry the shaft D past the vertical line through the points of engagement of the shoes under the load, and the shoes will fall over backward, letting the load down onto the roller E, the shoes falling in between the side-bars of the brackets C and being out of the way of the load. The pawl and ratchet pertaining to the roll E, which permits right-handed movement of the roll, will be now engaged, so that the roller will be adapted to rotate in the direction of the arrow and prevented from rotating in the opposite direction, while the wheels 4 4, by reason of their pawl-and-ratchet devices, can revolve only in the direction of the arrow adjacent to the ratchet 5 on Fig. 2. Now, as the load rests upon the roller E, the alternate raising and lowering of the truck-frame side bars A by means of the handles will cause the rollers E and the wheels 4 to be alternately fed forward under the load, the roller at its point of contact with the load affording a fulcrum when the handles are depressed, and the wheels in that movement rolling freely over the floor, and said wheels at their point of contact with the floor affording a fulcrum while the handles are being raised, the roller E in that movement rolling under the load, rotating as it rolls and being prevented from reverse movement. Such alternate raising and lowering being continued, the load will eventually be balanced upon the roller E, and then overbalanced rearward toward the truck, and will fall onto the latter in position in which it may be carried. After the load has been moved upward or rearward on the truck to a proper distance the drop-spur 16 is released and, falling, engages its nose with the box and assists in holding the load on the truck.

If desired, the rollers E and B, respectively, as well as the remaining wheels, may be slightly corrugated to increase their frictional hold on the load and roller, respectively.

It will be observed that the truck constructed as described is adapted to stand with the frame substantially upright, resting upon the wheels 4 4 and the roller or rollers, if the roller is divided, and that it is thus adapted to be most conveniently set away in a small space close against the wall, without danger of sliding down to horizontal position if accidentally disturbed, as is the case with trucks of ordinary construction, and, being ordinarily in upright position, it can be pushed quickly into place or out of the way easily, which is a matter of great convenience in warehouses, where trucks used by many different persons are liable to be in the way and, if of the ordinary form, are very troublesome because of their instability in upright position even when leaning against a support. When a load is on the truck, the latter being horizontal, it may extend from the roller E to the roller B, resting upon both the rollers, and in that case it may sometimes be convenient to slide the load over the truck lengthwise with respect to the latter, and the left-hand pawl and ratchet, with which the roll E is provided, may be engaged, instead of the right-hand pawl and ratchet, when it is desired to move the load over the roll from the handle toward the opposite end; but in moving the load in the opposite direction, the right-hand pawl and ratchet being engaged, the roller E has the same movement as the roller B, and its two rollers, being locked against the reverse movement, adapt the truck to serve with great efficiency as an inclined plane upon which the load may be advanced for loading onto cars or elevated platforms, the rollers preventing downward sliding and rotating freely in the upward or advance movement. By bringing both the pawls into engagement with their respective ratchets on the roller E the truck, standing on end and resting its weight partly on the roller, is prevented from being too easily moved from the position in which it may be placed.

For loading comparatively light loads onto the truck all pawl-and-ratchet devices may be left unengaged, the wheels 4 4 and the roller E being all perfectly free to rotate on their shaft or in their bearings, and in that case, the load having been lifted, as shown in Fig. 2, and the truck pushed under it until it has fallen onto the roller E, as described, a further direct pushing of the truck may be sufficient to cause it to advance under the load, the wheels rolling on the floor and the roller rolling on the under surface of the load until the latter is overbalanced, and, fulcruming on the roller E, falls rearward on the truck-handles. In this mode of use it will be understood that the pawl-and-ratchet mechanism is out of use, or, if left in engagement, is not utilized in the same manner as when the pump-handle action above described is adopted to force the truck onto the load.

I claim—

1. In a truck, in combination with the principal frame and its primary supporting-wheels, a supplemental wheel or roller located in such position with respect to the principal wheels as to be off the ground and to extend above the plane of the load-supporting surface of the truck when the latter is horizontal, and on the ground when the truck is in a position of stable equilibrium approximately vertical over its wheels: substantially as set forth.

2. In a truck, in combination with the principal frame provided with more than two wheels and adapted to be supported by such wheels in stable equilibrium approximately vertical, and the shoe pivotally connected to the frame, and stopped thereagainst, as described, whereby the point of the shoe may freely follow the ground when the truck is upright, but is off the ground when the truck moves forward resting on all its wheels: substantially as set forth.

3. In a truck, in combination with the primary wheels on which one end is supported, the wheel or roller journaled and having the periphery higher than the principal wheels when the truck is down, and the shoe pivoted to the frame and adapted to fold back toward the frame from a position approximately at right angles thereto and having its point extending when at the first of said positions higher than the periphery of said wheel or roller, whereby the load lifted upon the point of the shoe is carried over onto the wheel or roller as the shoe folds back toward the frame: substantially as set forth.

4. In combination with the truck and the primary supporting-wheels and pawl-and-ratchet mechanism by which the wheels may be locked against backward rotation; the wheel or roller and the shoes situated in relation to the principal wheels substantially as described.

5. In a truck, in combination with the truck-frame and its principal supporting-wheels, said wheels being provided with pawl-and-ratchet mechanism adapted, when engaged, to permit rotation in one direction only; a wheel or roller having its bearings supported upon the frame, said wheel or roller having pawl-and-ratchet mechanism adapted to permit it to rotate in a direction opposite to that of the main wheels: substantially as set forth.

6. In combination with the principal frame and its main supporting-wheels, said wheels having a pawl-and-ratchet mechanism adapted when engaged to permit rotation in one direction only; the wheel or roller E having its bearings supported on the frame, said wheel or roller being provided with pawl-and-ratchet mechanism adapted when engaged to permit rotation in the opposite direction from the main wheels, and the shoes pivotally connected to the frame: substantially as set forth.

7. In a truck, in combination with the frame and its wheels, the wheel or roller E having its bearings supported on its frame, and pawl-and-ratchet mechanism connected with said roller adapted when engaged to permit the roller to rotate in one direction only; the shoes pivotally connected to the frame and adapted to fold back toward the same, and the roller B journaled near the upper end of the frame and provided with pawl-and-ratchet mechanism adapted when engaged to prevent rotation except in the same direction as the roller E: substantially as set forth.

8. In a truck, in combination with a longitudinal rod, the dog having the sleeve hung loosely and adapted to slide on the rod and provided with a spur or claw at its free end: substantially as set forth.

9. The combination with a suitable frame, provided with two supporting-wheels, having pawls and ratchets, fixed brackets secured to said frame, provided with a transverse roller having right and left handed ratchets, shoes pivotally secured to a shaft supporting said transverse roll, and a transverse roll within the upper end of said frame provided with a pawl and ratchet and a rod secured within said frame provided with a drop-spur, all arranged substantially as and for the purpose set forth.

10. The combination with a suitable frame provided with main supporting-wheels, said wheels having pawls and ratchets permitting rotation in one direction and auxiliary frame secured to said main frame provided with a roll having pawls and ratchets permitting rotary motion in a direction opposite to that of the main wheels and pivotal shoes secured within said auxiliary frame and the drop-spur 17 and the secondary roll B provided with suitable ratchets, all substantially as and for the purpose set forth.

11. In a hand-truck, the combination of the main frame A, having braces 1, 2, the main supporting-shaft 3, provided with the wheels 4, having pawls and ratchets, the fixed arms C secured to said frame A, provided with the shaft D, the roll E mounted upon said shaft and provided with the pawls and ratchets 10, 11, 12 and 13, and the shoes F pivoted upon the shaft D, and adapted to operate substantially as and for the purpose set forth.

In testimony whereof I have hereunto set my hand, at Chicago, Illinois, this 21st day of November, 1893, in the presence of two witnesses.

HENRY O. THOMAS.

Witnesses:

CHAS. S. BURTON,
JEAN ELLIOTT.